UNITED STATES PATENT OFFICE.

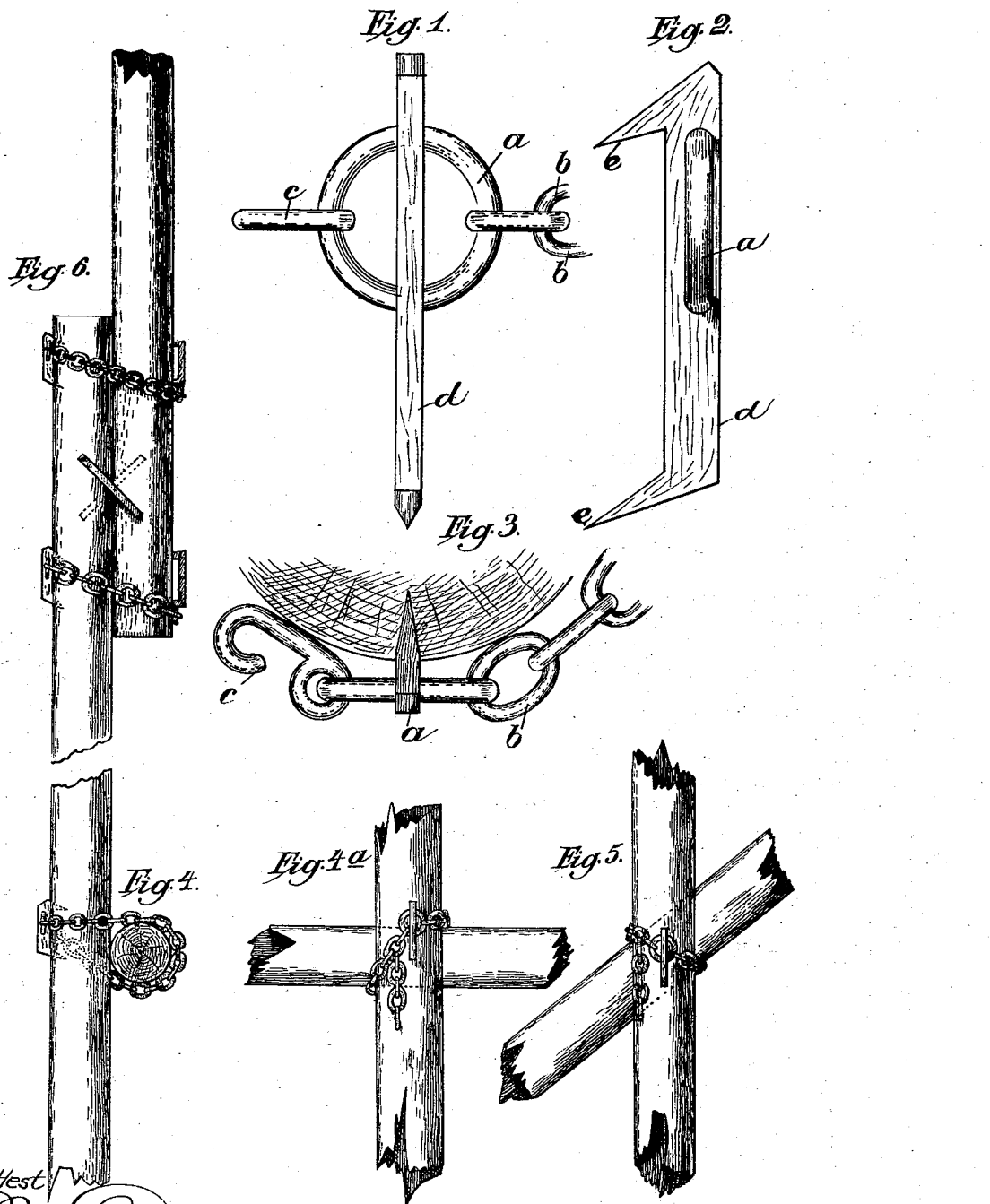

ALBIN KÜHN, OF HEIDELBERG, GERMANY.

CONTRIVANCE FOR FASTENING SCAFFOLDS.

SPECIFICATION forming part of Letters Patent No. 508,949, dated November 21, 1893.

Application filed March 3, 1893. Serial No. 464,572. (No model.)

*To all whom it may concern:*

Be it known that I, ALBIN KÜHN, architect, of Heidelberg, in the Kingdom of Prussia and German Empire, have invented a new and useful Contrivance for Fastening Scaffolds, of which the following is a specification, reference being had therein to the accompanying drawings.

This invention consists of an appliance, whereby the sure and rapid binding together of scaffold poles, and other bodies of a like kind, is attained, irrespective of the stoutness of such poles, or other bodies, and at any desired angle, as well as the rapid disconnecting thereof.

In the accompanying drawings, the invention is fully illustrated.

Figure 1, is a plan view of my device for attaching two poles together, part of the chain only being shown. Fig. 2, is a side elevation of the brace with its ring. Fig. 3, is a view showing a section of a portion of a pole with the brace in position thereon. Fig. 4, is a view of two poles connected by my device showing one pole in section. Fig. 4$^a$ is a view at right angles to Fig. 4. Fig. 5, illustrates the application of the device to poles placed at an acute angle to each other, and Fig. 6, is a view showing two poles with their ends connected.

The appliance consists of a brace $d$ with ring $a$ the points $e$ of the brace $d$ being bent downward or under so as to act as a hook. The ring $a$ is connected, on one side, with the hook $c$ and, on the other side, with the chain $b$. It has the effect of holding the brace firmly in position and preventing it from being turned under the strain. By these means an absolutely secure joining of the scaffold-poles is attained, the points $e$ being pressed into the wood of the scaffolding, by the weight of the scaffold and so preventing any subsequent loosening of the joint.

As set forth above, this appliance renders possible the joining together of scaffold-poles of different forms in an absolutely certain manner, and at any angle, as well as the rapid disconnecting of the poles and the taking down of the scaffold, this being effected by the points $e$ being pressed into the scaffolding by the weight of the scaffold.

What I claim, and desire to secure by Letters Patent of the United States, is—

A pole connector for scaffolds comprising a brace having inclined pointed projections for engaging one pole, a ring having its central portion secured to said brace, a hook upon the ring on one side of the brace, and a chain connected to the hook upon the other side adapted to pass around the adjoining pole and engage the hook, substantially as described.

In witness whereof I have hereunto set my hand in presence of two witnesses.

ALBIN KÜHN.

Witnesses:
 GOTTF MEUX,
 L. KOHLHAMMER.